United States Patent
Shirai

(10) Patent No.: US 8,458,080 B2
(45) Date of Patent: *Jun. 4, 2013

(54) BICYCLE SUSPENSION CONTROL APPARATUS

(75) Inventor: Toyoto Shirai, Osaka (JP)

(73) Assignee: Shimano Inc., Osaka (JP)

( * ) Notice: Subject to any disclaimer, the term of this patent is extended or adjusted under 35 U.S.C. 154(b) by 215 days.

This patent is subject to a terminal disclaimer.

(21) Appl. No.: 13/075,600

(22) Filed: Mar. 30, 2011

(65) Prior Publication Data

US 2012/0253599 A1    Oct. 4, 2012

(51) Int. Cl.
*G06Q 40/00*    (2006.01)

(52) U.S. Cl.
USPC .............................. 705/37; 280/283; 280/5.5

(58) Field of Classification Search
None
See application file for complete search history.

(56) References Cited

U.S. PATENT DOCUMENTS

| | | | |
|---|---|---|---|
| 5,971,116 | A | 10/1999 | Franklin |
| 7,874,567 | B2 | 1/2011 | Ichida et al. |
| 2009/0192673 | A1 | 7/2009 | Song et al. |
| 2010/0218633 | A1* | 9/2010 | Ichida et al. ............... 74/473.12 |
| 2010/0327542 | A1* | 12/2010 | Hara et al. .................. 280/5.503 |

FOREIGN PATENT DOCUMENTS

| | | |
|---|---|---|
| EP | 2 269 903 A1 | 1/2011 |
| EP | 2 309 352 A1 | 4/2011 |
| JP | 1-145215 A | 6/1989 |
| WO | WO 99/59860 A1 | 11/1999 |

OTHER PUBLICATIONS

European Search Report of corresponding EP Application No. 11 17 6191.2 dated Oct. 5, 2011.

* cited by examiner

*Primary Examiner* — Thomas Tarcza
*Assistant Examiner* — Garrett Evans
(74) *Attorney, Agent, or Firm* — Global IP Counselors

(57) ABSTRACT

A bicycle suspension control apparatus is basically provided with a power supply sensor and a controller. The power supply sensor detects a power level of a power supply being supplied from the power supply to electrically adjustable front and rear suspensions. The controller is configured to selectively change at least one electrically adjustable suspension parameter of each of the front and rear suspensions. The controller receives a power level signal from the power supply sensor. The controller prohibits changing the electrically adjustable suspension parameter of the rear suspension upon the power supply sensor detecting the power level of the power supply being below a first prescribed power level. The controller permits changing the electrically adjustable suspension parameter of the front suspension upon the power supply sensor detecting the power level of the power supply being below the first prescribed power level.

10 Claims, 6 Drawing Sheets

BICYCLE SUSPENSION CONTROL APPARATUS

BACKGROUND

1. Field of the Invention

This invention generally relates to a control device configured to control bicycle suspensions. More specifically, the present invention relates to a bicycle suspension control apparatus for controlling an electrically adjustable suspension.

2. Background Information

Some bicycles are provided with a front suspension and/or a rear suspension. The front suspension typically includes a pair of shock absorbers that form portions of the legs of the front wheel fork, and the rear suspension typically includes a shock absorber with one end mounted to the front portion of the frame and another end mounted to a pivoting rear swing arm that supports the rear wheel.

Some shock absorbers are constructed to allow the rider to vary several operating parameters to accommodate varying riding conditions. Such operating parameters typically include compression damping, rebound damping (to control the rate of shock absorber extension), and lockout. However, in the past, such adjustments were made manually and usually require the rider to dismount the bicycle and set each operating parameter adjustment control device separately. In more recent times, these operating parameters are adjusted by electric actuators. Some bicycles use a battery to supply electrical power to operate the electric actuators that are used to adjust the operating parameters of the suspension. In this case, the power of battery will become lower and lower each time one of the operating parameters of the suspensions is changed. At a certain point, the power level of the battery can discharge to a point in which the rider is suddenly prevented from adjusting the operating parameters of the suspension.

SUMMARY

In view of the state of the known technology, a bicycle suspension control apparatus is disclosed herein that stops control of a bicycle suspension by a rider when a power supply level falls below a prescribed power level.

In one embodiment, a bicycle suspension control apparatus is provided that basically comprises a power supply sensor and a controller. The power supply sensor detects a power level of a power supply being supplied from the power supply to electrically adjustable front and rear suspensions. The controller is configured to selectively change at least one electrically adjustable suspension parameter of each of the front and rear suspensions. The controller receives a power level signal from the power supply sensor. The controller prohibits changing the electrically adjustable suspension parameter of the rear suspension upon the power supply sensor detecting the power level of the power supply being below a first prescribed power level. The controller permits changing the electrically adjustable suspension parameter of the front suspension upon the power supply sensor detecting the power level of the power supply being below the first prescribed power level.

These and other objects, features, aspects and advantages of the bicycle suspension control apparatus will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
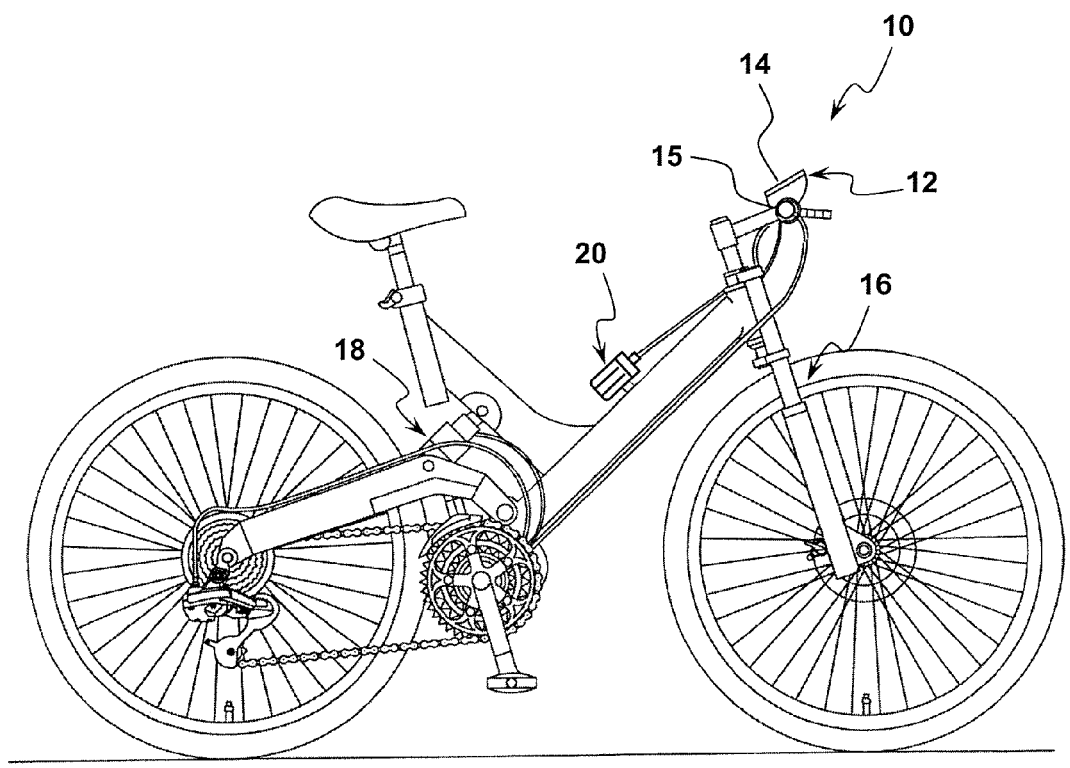
FIG. 1 is a side elevational view of a bicycle that is equipped with a bicycle suspension control apparatus in accordance with one embodiment.

Referring initially to FIG. 1, a bicycle 10 is illustrated that is equipped with a bicycle suspension control apparatus 12 having a controller 14 that is mounted on a handlebar 15 for controlling an electrically adjustable front suspension 16 and an electrically adjustable rear suspension 18 in accordance with a first embodiment. The bicycle suspension control apparatus 12 is also provided with a power supply 20 (e.g., a battery as shown) for supplying electrical power to the controller 14 and to the electrically adjustable front and rear suspensions 16 and 18. The power supply for supplying electrical power to the controller 14 and the electrically adjustable front and rear suspensions 16 and 18 is not limited to a battery as the power supply 20. Rather, for example, a generator by itself or a generator with a battery can be used for the power supply of the controller 14 and the electrically adjustable front and rear suspensions 16 and 18. Other than the bicycle suspension control apparatus 12, as explained below, the bicycle 10 can be any type of bicycle front and rear suspensions. Thus, the parts of the bicycle 10 will not be discussed herein, except for those parts that will assist in the understanding of the bicycle suspension control apparatus 12.

As explained below in more detail, the controller 14 is configured to selectively change various setting states of the front and rear suspensions 16 and 18 in response to a manual input from a rider or an automatic input from a control program in the controller 14. In other words, the controller 14 is configured to selectively change at least one electrically adjustable suspension parameter of each of the front and rear suspensions 16 and 18 either manually or automatically. Also when the power supply level of the power supply 20 becomes lower than a prescribed power level (a predetermined value), the controller 14 automatically stops controlling one or both of the front and rear suspensions 16 and 18 depending on the power supply level of the power supply 20.

The power supply 20 is a battery in the illustrated embodiment. The battery can be, for example, a nickel hydrogen battery or a lithium ion battery. The power supply 20 constitutes an electrical energy storage device or storage element that serves as a power source for the electrical components of the bicycle. For example, the power supply 20 preferably supplies a power supply voltage V of V1 volts (DC) to the controller 14 and the front and rear suspensions 16 and 18.

In this embodiment, for example, the controller 14 is preferably configured to change the setting state of the front and rear suspensions 16 and 18 between a lockout state and a non-lockout state. However, the controller 14 is not limited to changing the lockout state of the front and rear suspensions 16 and 18 as explained below. In this way, at least one of the front and rear suspensions 16 and 18 can still be controlled by rider. For example, in the case of controlling the lockout and non-lockout states, it is normally preferable to stop the rear suspension 18 before stop the front suspension 16 so that the rider can continue to adjust the lockout and non-lockout states the front suspension 16.

Figure 3:
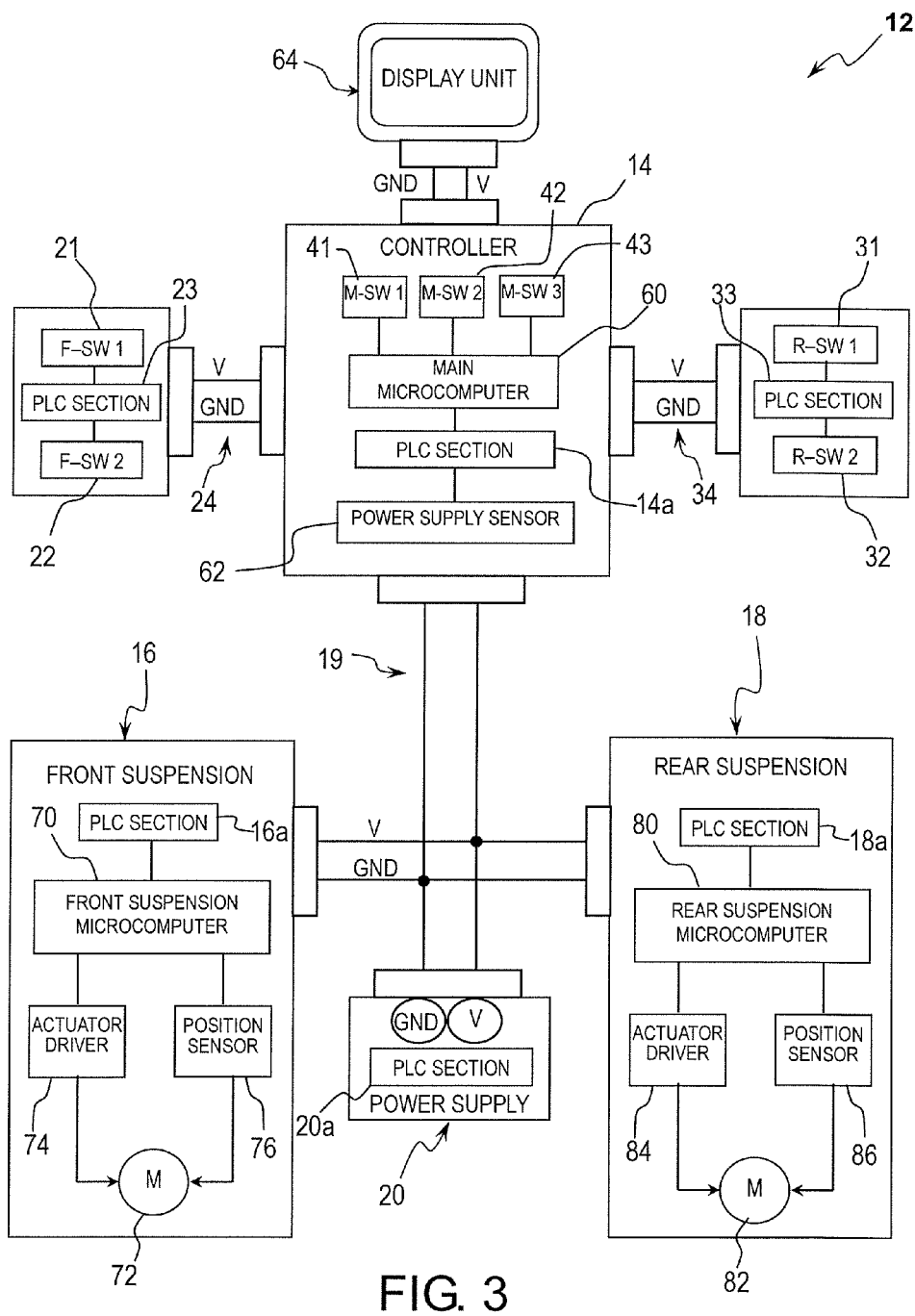
FIG. 3 is a schematic block diagram showing the entire configuration of the bicycle suspension control apparatus.
Figure 4:
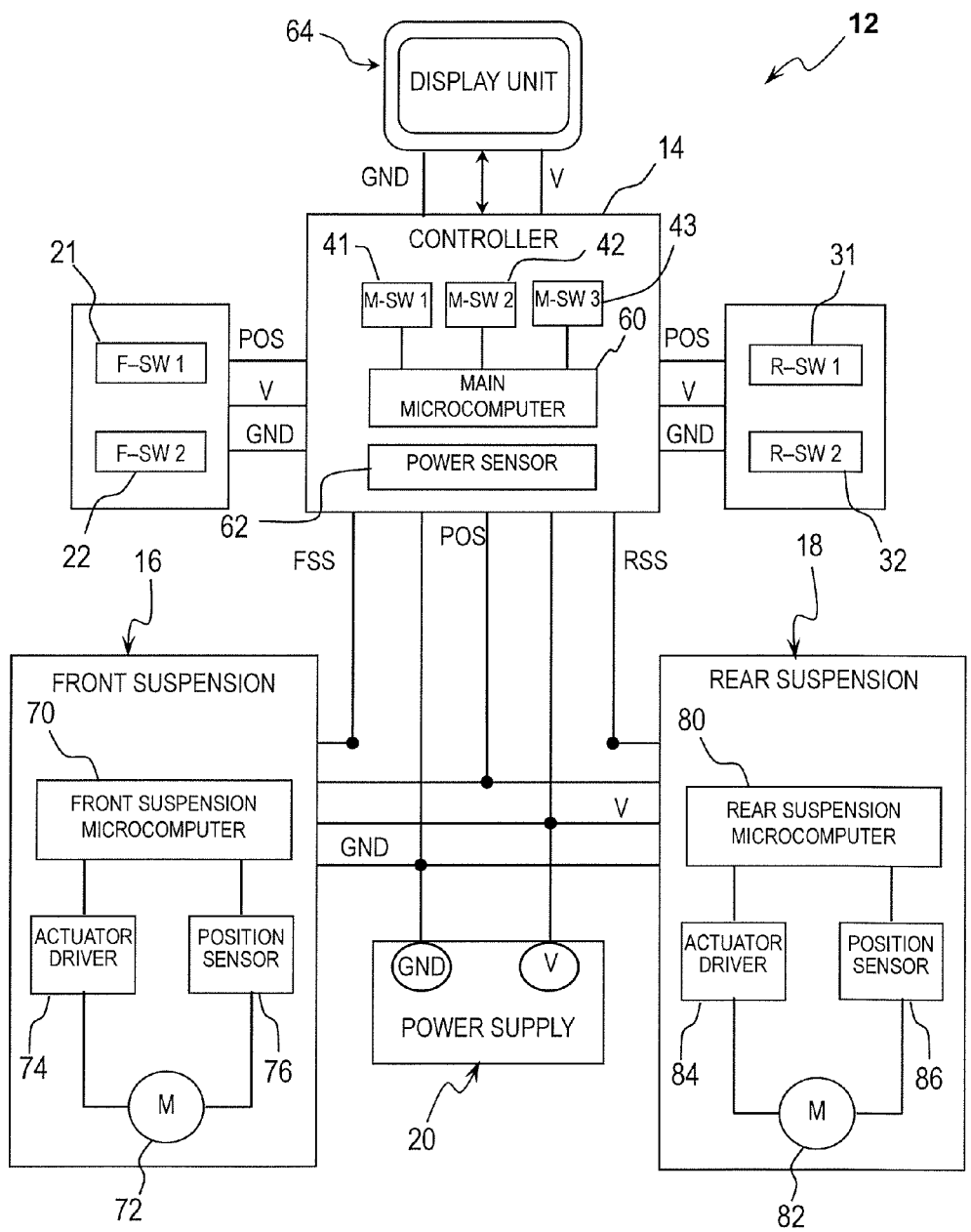
FIG. 4 is an alternative schematic block diagram showing the entire configuration of the bicycle suspension control apparatus.

In the illustrated embodiment of FIG. 3, the controller 14 is provided with an electric power line communication section 14a that is configured to execute communication by PLC (power line communications), i.e., to execute two-way communications through an electric power line 19, with an electric power line communication section 16a of the front suspension 16, an electric power line communication section 18a of the rear suspension 18 and an electric power line communication section 20a of the power supply 20. Thus, control signals that control the front and rear suspensions 16 and 18 are superimposed on the power source voltage in the electric power line 19 that interconnect the controller 14, the front and rear suspensions 16 and 18 and the power supply 20. In this way, data can be transmitted between the controller 14 and the front and rear suspensions 16 and 18 and the power supply 20 by the electric power line 19. The electric power line 19 includes at least a ground wire and a voltage line that are connected between each of the electrical components. Optionally, instead of using power line communications (PLC), in addition to a ground wire GND and a voltage wire V, separate signal wires POS, FSS and RSS can be provided for transmitting data as needed and/or desired as seen in FIG. 4.

Figure 2:
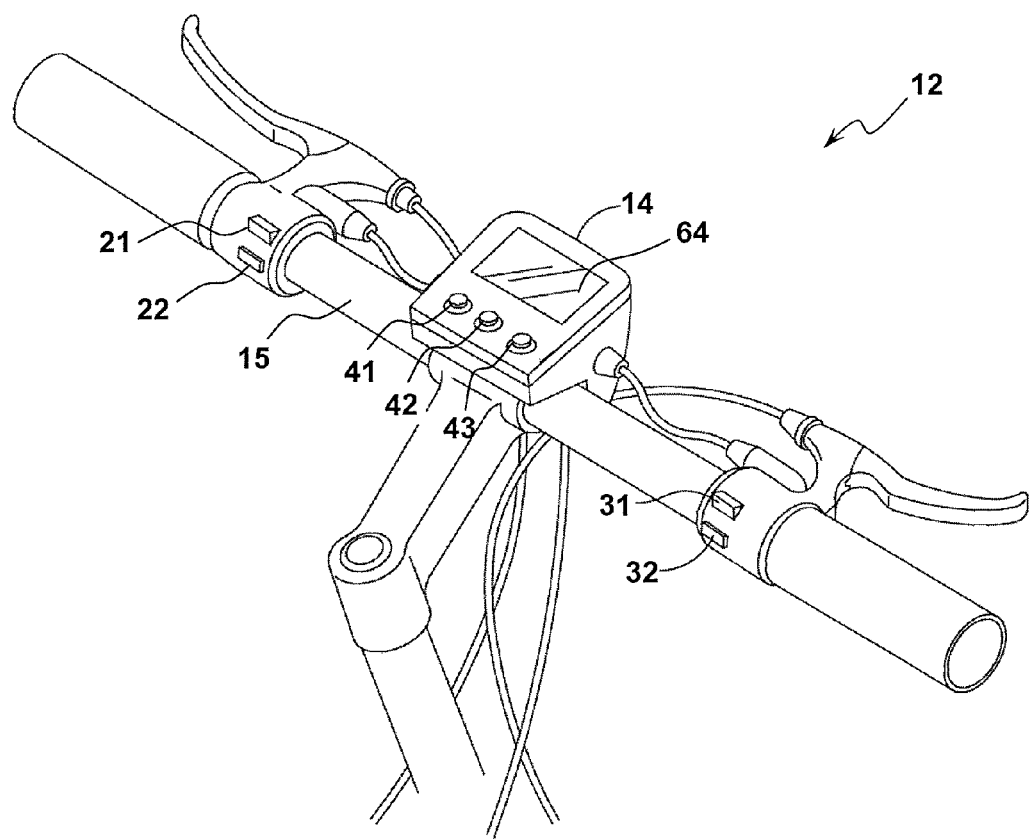
FIG. 2 is a perspective view of the handlebar area of the bicycle illustrated in FIG. 1, with a controller and a pair of suspension operating devices mounted to a straight type handlebar.

In the illustrated embodiment, the front suspension 16 is manually controlled by a first switch 21 (F-SW1) for setting a first electrically adjustable suspension parameter (e.g., a lockout state, a first damping rate and a first travel-stroke length) of the front suspension 16 and a second switch 22 (F-SW2) for setting a second electrically adjustable suspension parameter (e.g., a non-lockout state, a second damping rate and a second travel-stroke length) of the front suspension 16. These first and second switches 21 and 22 are electrically connected to the controller 14, which is mounted on the handlebar 15 of the bicycle 10 as seen in FIG. 2. Preferably, the first and second switches 21 and 22 are provided with an electric power line communication section 23 to execute two-way communications through the electric power lines with the electric power line communication section 14a of the controller 14. In this way, data can be transmitted from the first and second switches 21 and 22 to the controller 14 by an electric power line 24. The electric power line 24 includes at least a ground wire and a voltage line. Optionally, in addition to a ground wire GND and a voltage wire V, separate signal wires POS can be provided for transmitting data as needed and/or desired as seen in FIG. 4.

Similarly, the rear suspension 18 is manually controlled by a first switch 31 (R-SW1) for setting a first electrically adjustable suspension parameter (e.g., a lockout state, a first damping rate and a second travel-stroke length) of the rear suspension 18 and a second switch 32 (R-SW2) for setting a second electrically adjustable suspension parameter (e.g., a non-lockout state) of the rear suspension 18. These first and second switches 31 and 32 are also electrically connected to the controller 14. Preferably, the first and second switches 31 and 32 are provided with an electric power line communication section 33 to execute two-way communications through the electric power lines with the electric power line communication section 14a of the controller 14. In this way, data can be transmitted from the first and second switches 31 and 32 to the controller 14 by an electric power line 34. The electric power line 34 includes at least a ground wire and a voltage line. Optionally, separate signal wires can be provided for transmitting data as needed and/or desired as seen in FIG. 4.

While each of the switches 21, 22, 31 and 32 are illustrated as being a push button type of switch, it will be apparent from this disclosure that other types of switches can be used. For example, a single toggle switch can be used for performing the function of two of the switches. Moreover, depending on the type of suspension(s) provided on the bicycle 10 and/or the desired control of the adjustable suspension parameters, a single switch can be used to control both the front and rear suspensions 16 and 18 simultaneously. For, example, a single switch can be provided to simultaneously change both the front and rear suspensions 16 and 18 between a lockout state and a non-lockout state.

In the illustrated embodiment, as seen in FIG. 2, the controller 14 is mounted on the handlebar 15 of the bicycle 10 at locations near the gripping portion of the bicycle 10. However, the controller 14 can be mounted in other locations as needed and/or desired. Moreover, in FIG. 2, the switches 21, 22, 31 and 32 are illustrated as being remotely connected to the controller 14. However, it may be desirable to have the switches 21, 22, 31 and 32 integrated with the housing of the controller 14. Also preferably, data is transmitted from the first and second switches 31 and 32 to the controller 14 by an electric power line 34. The electric power line 34 includes at least a ground wire and a voltage line. Optionally, separate signal wires can be provided for transmitting data as needed and/or desired. Alternatively, data can be transmitted from the first and second switches 21 and 22 and/or the first and second switches 31 and 32 to the controller 14 by wireless communication devices. Thus, the term "signal" as used herein is not limited to an electrical signal, but includes other types of signals such as a command.

In the illustrated embodiment, three mode switches 41, 42 and 43 are electrically connected to the controller 14 for controlling operation modes of controller 14 and operation modes of the switches 21, 22, 31 and 32. By using one or more of the mode switches 41, 42 and 43, the user can selectively change which of the electrically adjustable suspension parameters are controlled by the switches 21, 22, 31 and 32. While the mode switches 41, 42 and 43 are illustrated as being integrated with the housing of the controller 14, one or more of the mode switches 41, 42 and 43 can be remotely located from the controller 14.

In the illustrated embodiment, the controller 14 further includes a main microcomputer 60 and a power supply sensor 62. Optionally, the bicycle suspension control apparatus 12 is also provided with a display unit 64 that can be part of the controller 14, as shown, or a separate member that is electrically or wirelessly connected to the controller 14. Preferably, the display unit 64 indicates the current voltage or power level to the rider. In the illustrated embodiment, for example, the power supply sensor 62 includes a voltage sensor for determining the power level of the power supply 20. Preferably, the front suspension 16 includes a FS microcomputer 70, an actuator 72, an actuator driver 74 and a position sensor 76, while the rear suspension 18 includes a RS microcomputer 80, an actuator 82, an actuator driver 84 and a position sensor 86.

The microcomputer 60 of the controller 14 and the microcomputers 70 and 80 of the front and rear suspensions 16 and 18 together constitute a bicycle adjusting controller of the bicycle suspension control apparatus. In other words, the main microcomputer 60 of the controller 14 cooperates with the microcomputers 70 and 80 of the front and rear suspensions 16 and 18 to control the adjustments of the parameters of the front and rear suspensions 16 and 18. The bicycle adjusting controller (e.g., the microcomputers 60, 70 and 80) of the bicycle suspension control apparatus is operatively coupled to the power supply sensor 62 to receive a power level signal from the power supply sensor 62, in which the power level signal is indicative of a current power (voltage) level of the power supply 20. The detection results of the power supply sensor 62 can be sent to each of the microcomputer 60 of the controller 14 and the microcomputers 70 and 80 of the front and rear suspensions 16 and 18, or only one of the microcomputers 60, 70 and 80 as needed and/or desired. While three separate microcomputers 60, 70 and 80 are used to form the bicycle adjusting controller of the bicycle suspension control apparatus in this illustrated embodiment, fewer or more microcomputers can be utilized as needed and or desired. In other words, the microcomputers 70 and 80 of the front and rear suspensions 16 and 18 can be eliminated and their functions and operations can be combined into the microcomputer of the controller 14 as needed and/or desired. Thus, the bicycle suspension control apparatus can be configured such that the main microcomputer 60 and the front suspension microcomputer 70 and the rear suspension microcomputer 80 are combined together as a single microcomputer.

Basically, the controller 14 receives the suspension adjustment signals from the switches 21, 22, 31 and 32, respectively, when they are operated, and then transmits suspension control signals to the microcomputers 70 and 80 of the front and rear suspensions 16 and 18, respectively. In other words, the main microcomputer 60 receives the input signals from both the switches 21, 22, 31 and 32, and the mode switches 41, 42 and 43 to manually control the settings of the front and rear suspensions 16 and 18.

The power supply sensor 62 detects a power level of the power supply 20. The controller 14 receives a power level signal from the power supply sensor 62 for determining the power level of the power supply 20. The display unit 64 displays various data regarding the front and rear suspensions 16 and 18, the power supply 20 and other components of the bicycle 10.

As explained below, the bicycle adjusting controller (e.g., the microcomputers 60, 70 and 80) prohibits the rider from manually changing the electrically adjustable suspension parameters of the rear suspension 18 upon the power supply sensor 62 detecting the power level of the power supply 20 being below a first prescribed power level P1. On the other hand, the bicycle adjusting controller (e.g., the microcomputers 60, 70 and 80) permits the rider to manually change the electrically adjustable suspension parameters of the front suspension 16 upon the power supply sensor 62 detecting the power level of the power supply 20 being below the first prescribed power level P1. However, the bicycle adjusting controller (e.g., the microcomputers 60, 70 and 80) prohibits the rider from manually changing the electrically adjustable suspension parameter of the front suspension 16 upon the power supply sensor 62 detecting the power level of the power supply 20 being below a second prescribed power level P2 that is lower than the first prescribed power level P1. However, preferably, the bicycle adjusting controller (e.g., the microcomputers 60, 70 and 80) permits the rider to only change the front suspension from a lockout state to a non-lockout state while the power level of the power supply 20 is below the second prescribed power level P2. In the illustrated embodiment, for example, the bicycle adjusting controller (e.g., the microcomputers 60, 70 and 80) sets a third prescribed power level P3 such that the bicycle adjusting controller stops adjustment of the front and rear suspensions 16 and 18 prior to complete discharge of the power supply 20 while the power level of the power supply is below the third prescribed power level P3. The third prescribed power level P3 can be equal to the second prescribed power level P2 or a lower value as needed and/or desired. In any event, the third prescribed power level P3 is set to a value that stops operation of both of the rear and front suspensions 16 and 18 prior to complete discharge of the power supply 20.

In the illustrated embodiment, for example, the front and rear suspensions 16 and 18 are fully adjustable such that the bicycle adjusting controller (e.g., the microcomputers 60, 70 and 80) is further configured to selectively change electrically adjustable suspension parameters of each of the front and rear suspensions 16 and 18. The electrically adjustable suspension parameters of each of the front and rear suspensions 16 and 18 include, but not limited to, at least (1) a setting state of each of the front and rear suspensions 16 and 18 between a lockout state and a non-lockout state, (2) a damping rate of each of the front and rear suspensions 16 and 18, and (3) a travel-stroke length of each of the front and rear suspensions 16 and 18. The damping rate includes a compression damping rate and/or a rebound damping rate. The controller 14 is preferably further configured to a default mode that prohibits electrical energy from being supplied to change any of these electrically adjustable suspension parameters of the rear suspension 18 while the power level of the power supply 20 is below the first prescribed power level P1.

Moreover, the controller 14 is preferably further configured to a default mode that prohibits electrical energy from being supplied to change any of these electrically adjustable suspension parameters of the front suspension 16 while the power level of the power supply 20 is below the second prescribed power level P2. The controller 14 is preferably further configured so that the rider can manually set an override mode in which only selected ones of the electrically adjustable suspension parameters of the front and rear suspensions 16 and 18 are prohibited. Also the controller 14 can be configured such that the prescribed power levels P1 and/or P2 are adjustably by either the user and/or based on environmental conditions (e.g., temperature, season, etc.).

Of course, it will be apparent to those skilled in the art from this disclosure that the front and rear suspensions 16 and 18 can be configured with less than all of the above electrically adjustable suspension parameters, if needed and/or desired. For example, the bicycle adjusting controller (e.g., the microcomputers 60, 70 and 80) can be configured to automatically change one, some, or all of the electrically adjustable suspension parameters (e.g., a lockout/non-lockout state, a damping rate and/or travel-stroke length) of the rear suspension 18 as the electrically adjustable suspension parameter that is prohibited from being subsequently changed either manually or automatically, or both, while the power level of the power supply 20 is below the first prescribed power level P1. Then when the power level of the power supply 20 is below the second prescribed power level P2, the bicycle adjusting controller (e.g., the microcomputers 60, 70 and 80) automatically prohibits one, some, or all of the electrically adjustable suspension parameters of the front suspension 16 from being subsequently changed either manually or automatically.

In the controller 14, the microcomputer 60 includes other a central processing unit (CPU) and other conventional components such as an input interface circuit, an output interface circuit, and storage devices such as a ROM (Read Only Memory) device and a RAM (Random Access Memory) device. The microcomputer 60 can be provided with various control programs that control the front and rear suspensions 16 and 18 and other components of the bicycle 10. For example, the microcomputer 60 includes manual control programs for manually controlling the front and rear suspensions 16 and 18, automatic control programs for automatically controlling the front and rear suspensions 16 and 18. The manual control program provides for controlling the front and rear suspensions 16 and 18 via the switches 21, 22, 31 and 32, and the mode switches 41, 42 and 43 when a manual operating mode is selected. The automatic control program provides for automatically controlling the front and rear suspensions 16 and 18 when an automatic mode is selected and when the power level of the power supply 20 is detected as falling below the first and second prescribed power levels P1 and P2. It will be apparent to those skilled in the art from this disclosure that the precise structure and algorithms for the controller 14 can be any combination of hardware and software that will carry out the functions of the present invention.

In the illustrated embodiment, the power supply sensor 62 is disposed in the housing of the controller 14. However, the power supply sensor 62 is not limited to being disposed in the housing of the controller 14. For example, the power supply sensor 62 can be disposed on anyone of the front and rear suspensions 16 and 18 and the power supply 20 as needed and/or desired. Moreover, the power supply sensor 62 includes at least one sensor element, but can be made of several sensor elements as needed and/or desired. Also the power supply sensor 62 can be from as a part of the microcomputers 60, 70 and/or 80 as needed and/or desired.

In this embodiment, the front suspension 16 includes a pair of combination air-oil operated shock absorbers with various adjustment elements. Preferably, the front suspension 16 includes an adjustment element for low speed and high speed compression damping, an adjustment element for stroke (piston travel or compression chamber volume), an adjustment element for air chamber pressure, for rebound damping, an adjustment element for lockout actuation, and an adjustment element for lockout force adjustment. Examples of such parameter adjustments may be found in current shock absorbers sold by suspension manufacturers. Since numerous types of conventional front suspensions can be utilized for the front suspension 16, the structure of the front suspension 16 will not be discussed and/or illustrated in detail.

In the front suspension 16 of the illustrated embodiments, the actuator 72 includes a reversible motor that is configured and arranged to drive a valve or the like of the front suspension 16. While the actuator 72 is illustrated as a motor in the illustrated embodiments, the actuator 72 can be other types of devices such as a solenoid. The position sensor 76 detects the position of the actuator 72 or other part of the front suspension 16 that is indicative its setting position. For example, it is also possible that the position sensor 76 detects a valve position for determining the setting position of the front suspension 16. The actuator 72 adjusts the position of the valve to set a state of the front suspension 16, e.g., a lockout state, a damping rate, a travel-stroke length, etc. The actuator driver 74 drives the actuator 72 in response to control signals from the FS microcomputer 70. The actuator driver 74 includes motor drivers and deceleration units for driving and decelerating the rotation of the actuator 72. The FS microcomputer 70 is configured and arranged to control the actuator driver 74 in response to an adjustment signal from the switches 21 and 22 via the controller 14. The FS microcomputer 70 includes control circuits with CPUs, storage units, computation units, and the like. The FS microcomputer 70 also includes software that controls the actuator 72 in accordance with adjustment signals outputted from the switches 21 and 22.

In this embodiment, the rear suspension 18 includes a combination air-oil operated shock absorber with a typical external spring (not shown in the drawings). The rear suspension 18 includes various adjustment elements. Preferably, the rear suspension 18 includes an adjustment element for spring preload, an adjustment element for low speed and high speed compression damping, an adjustment element for air chamber pressure adjustment, an adjustment element for air chamber volume adjustment, an adjustment element for rebound damping, an adjustment element for lockout actuation and an adjustment element for lockout force adjustment. Examples of such parameter adjustments may be found in current shock absorbers sold by suspension manufacturers. Since numerous types of conventional rear suspensions can be utilized for the rear suspension 18, the structure of the rear suspension 18 will not be discussed and/or illustrated in detail.

In the rear suspension 18, the actuator 82 is a reversible motor that is configured and arranged to drive a valve or the like of the rear suspension 18. While the actuator 82 is illustrated as a motor in the illustrated embodiments, the actuator 82 can be other types of devices such as a solenoid. The position sensor 86 detects the position of the actuator 82 or other part of the rear suspension 18 that is indicative its setting position. The actuator 82 adjusts the position of the valve to set a state of the rear suspension 18, e.g., a lockout state, a damping rate, a travel-stroke length, etc. The actuator driver 84 is configured and arranged to drive the actuator 82 in response to control signals from the RS microcomputer 80. The actuator driver 84 includes motor drivers and deceleration units for driving and decelerating the rotation of the actuator 82. The RS microcomputer 80 is configured and arranged to control the actuator driver 84 in response to an adjustment signal from the switches 31 and 32 via the controller 14. The RS microcomputer 80 includes control circuits with CPUs, storage units, computation units, and the like. The RS microcomputer 80 also includes software that controls the actuator 82 in accordance with adjustment signals outputted from the switches 31 and 32.

Furthermore, the position signals of the front and rear position sensors 76 and 86 are output to the controller 14 via the power line 19. In the controller 14, the position signals are converted into display signals, and the positions of the front and rear suspensions 16 and 18 are displayed by the display unit 64. Voltage data (VD: e.g., three stages of voltage data) is also output to the controller 14 via the power line 19. Furthermore, the adjustment signals are output from the controller 14 in accordance with the operation of the switches 21 and 22 and the switches 31 and 32 to set the front and rear suspensions 16 and 18 by the respective power lines 24 and 34.

Figure 5:
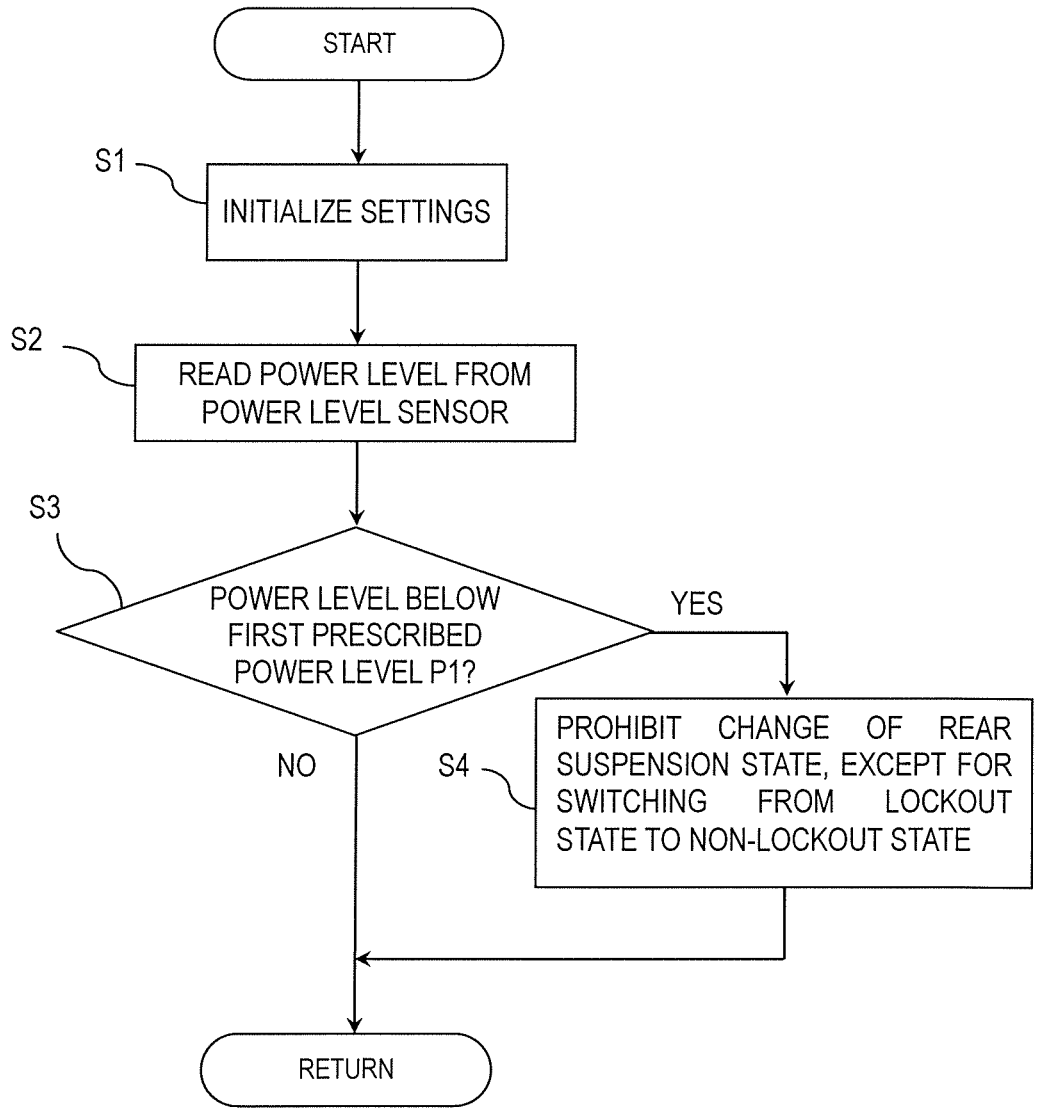
FIG. 5 is a flowchart showing a first control process executed by the controller of the bicycle suspension control apparatus.
Figure 6:
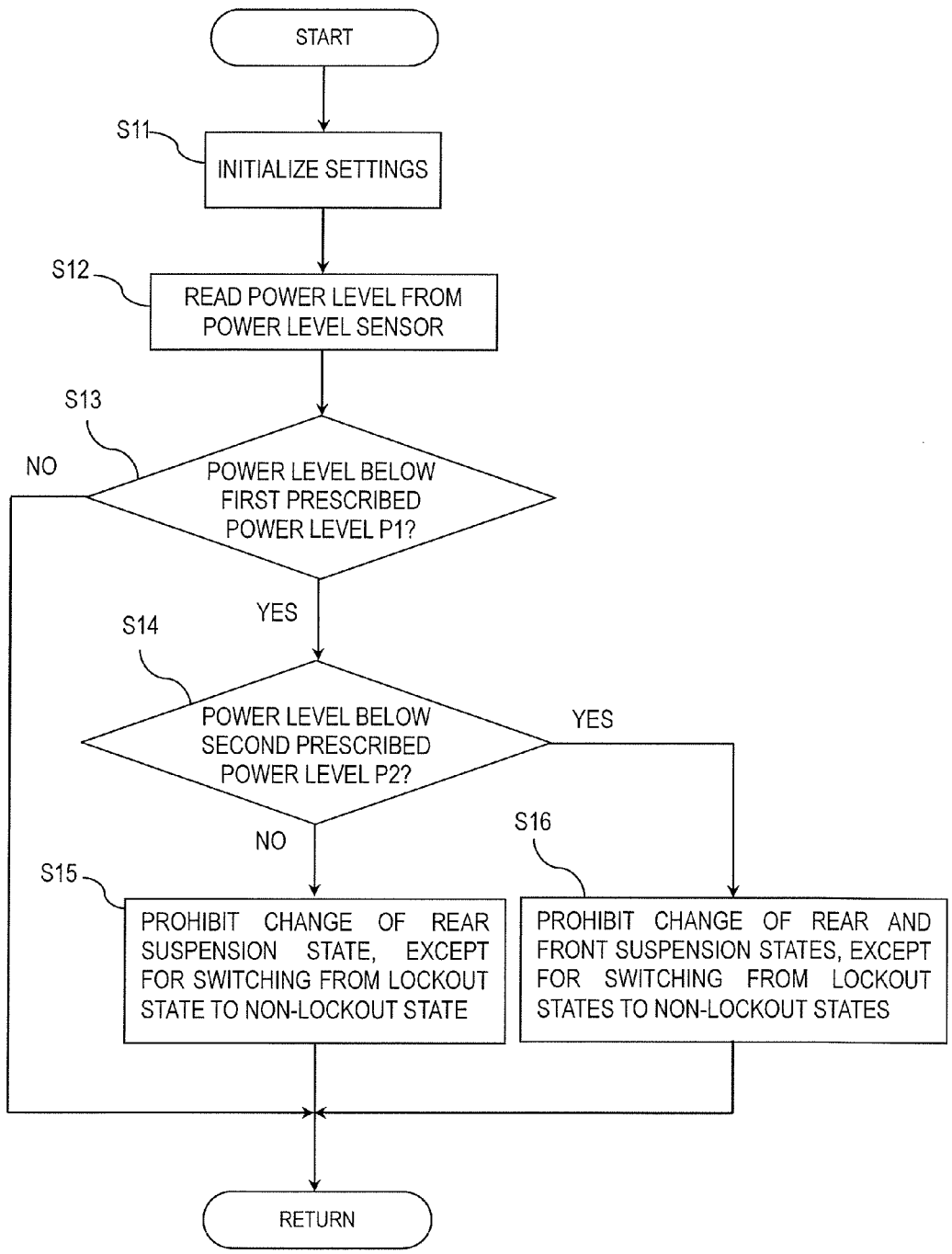
FIG. 6 is a flowchart showing a second control process executed by the controller of the bicycle suspension control apparatus.

In the control processes of FIGS. 5 and 6, the bicycle adjusting controller is programmed to control the supply of power to the front and rear suspensions 16 and 18 so that adjustment of the rear suspension 18 is stopped, except for switching the rear suspension 18 from its lockout state to its non-lockout state, and so that the front suspension 16 is maintained adjustable upon detecting the power level of the power supply 20 (i.e., the storage element) has dropped to an undesirable level (i.e., below the first prescribed power level P1). Furthermore, in the control process of FIG. 6, adjustments of both of the front and rear suspensions 16 and 18 are stopped, except for switching each of the front and rear suspensions 16 and 18 from its lockout state to its non-lockout state when the power level of the power supply 20 has dropped to below the second prescribed power level P2.

As mentioned above, if the power level of the power supply 20 drops further below the third prescribed power level threshold P3, then any adjustments of both of the front and rear suspensions 16 and 18 are prohibited. In other words, the bicycle adjusting controller stops adjustments of the front and rear suspensions 16 and 18 in response the power level of the power supply 20 being below the third prescribed power level P3 that is lower than the first and second prescribed power levels P1 and P2. Thus, the bicycle adjusting controller sets the third prescribed power level P3 to a value that stops adjustments of both of the front and rear suspensions 16 and 18 prior to complete discharge of the power supply 20 (e.g., the electrical energy storage device) when the power level of the power supply 20 is below the third prescribed power level P3. In this way, over discharge of the power supply 20 is restrained.

Turning now to the flow chart of FIG. 5, the bicycle adjusting controller (i.e., the controller 14, the FS microcomputer 70 and the RS microcomputer 80) conducts the process on a continuous basis every at prescribed time intervals once the controller 14 is turned "on" which results in power being supplied to the switches 21, 22 and the switches 31 and 32 and the front and rear suspensions 16 and 18.

In step S1, the all of the previous detected values and/or flags are cleared from memory. Then the process proceeds to step S2.

In step S2, the power (voltage) level of the power supply 20 is read from the power supply sensor 62. In other words, the power supply sensor 62 detects a power level of the power supply 20 being supplied from the power supply 20 to the electrically adjustable suspensions 16 and 18. The power (voltage) level is then transmitted to one or all of the microcomputers 60, 70 and 80. Then the process proceeds to step S3.

In step S3, the bicycle adjusting controller then determines if the power (voltage) level of the power supply 20 is below the first prescribed power level P1. If the power (voltage) level is below the first prescribed power level P1, then the process proceeds to step S4.

In step S4, the bicycle adjusting controller prohibits changing the rear suspension state of the rear suspension 18 upon the power supply sensor 62 detecting the power level of the power supply 20 being below a first prescribed power level P1. However, preferably, the bicycle adjusting controller only permits changing of the setting state of the rear suspension 18 from the lockout state to the non-lockout suspension state while the power level of the power supply 20 is below the first prescribed power level P1.

However, in step S3, if the bicycle adjusting controller determines the power (voltage) level of the power supply 20 is not below the first prescribed power level P1, then the process returns to the beginning to start again at the next prescribed time interval.

As mentioned above, there are at several ways for prohibiting the rear suspension state of the rear suspension 18 from being changed in step S4. For example, when the power level of the power supply 20 is below the first prescribed power level P1 (i.e., YES in step S3), the controller 14 can stop supplying power to the adjusting switches 31 and 32. Alternatively, for example, either the controller 14 or the RS microcomputer 80, or both ignores any adjustment signals from the adjusting switches 31 and 32 when the power level of the power supply 20 is below the first prescribed power level P1 (i.e., YES in step S3). Yet another alternative way of prohibiting the rear suspension state of the rear suspension 18 from being changed in step S4, for example, is to stop supplying power to the rear suspension 18 and/or selected components of the rear suspension 18.

Turning now to the flow chart of FIG. 6, an alternative control process will now be discussed. In the alternative control process, when voltage falls below the second prescribed power level P2, the bicycle adjusting controller (i.e., the controller 14, the FS microcomputer 70 and the RS microcomputer 80) stops adjustment of the front suspension 16. The second prescribed power level P2 is lower than the first prescribed power level P2. However, for example, it is possible to permit the rider to only change the setting of the front suspension 16 to from a lockout state to an non-lockout (unlocked) state before the bicycle adjusting controller (i.e., the controller 14, the FS microcomputer 70 and the RS microcomputer 80) stops adjustment the operation of the each suspension.

In this alternative process, steps S11 to S13 are identical to the control process of steps S1 to S3 of FIG. 5, and thus the descriptions of these steps will not be repeated with respect to the alternative control process of FIG. 6. In this alternative control process of FIG. 6, the bicycle adjusting controller (i.e., the controller 14, the FS microcomputer 70 and the RS microcomputer 80) conducts the process on a continuous basis every at prescribed time intervals once the controller 14 is turned "on" which results in power being supplied to the switches 21, 22 and the switches 31 and 32 and the front and rear suspensions 16 and 18.

In step S14, the bicycle adjusting controller determines if the power (voltage) level of the power supply 20 is below the second prescribed power level P2. If the power (voltage) level is not below the second prescribed power level P2, then the process proceeds to step S15. However, in step S14, if the bicycle adjusting controller determines the power (voltage) level of the power supply 20 is below the second prescribed power level P2, then process proceeds to step S16.

In step S15, the bicycle adjusting controller prohibits changing the rear suspension state of the rear suspension 18. Then the process returns to the beginning to start again at the next prescribed time interval. In step S15, prohibiting the suspension state of the rear suspension 18 from being changed is the same as in step S4 of FIG. 5, discussed above.

In step S16, the bicycle adjusting controller prohibits changing the front and rear suspension states of the front suspension 16 and the rear suspension 18, respectively. Then the process returns to the beginning to start again at the next prescribed time interval. In step S16, prohibiting the suspension state of rear suspension 18 from being changed is the same as in step S4 of FIG. 5, discussed above. In step S16, prohibiting, the prohibiting the front suspension state of the front suspension 16 from being changed can be accomplished similar to step S4 of FIG. 5 by: (1) the microcomputer 60 in the controller 14 stopping the supply of power to the switches 21 and 22; (2) the microcomputer 60 in the controller 14 not outputting and/or stopping the front adjusting signal to the FS microcomputer 70 of the rear suspension 18, even though a front adjusting signal has been received by the microcomputer 60 in the controller 14; (3) the FS microcomputer 70 not operating the actuator driver 84 and the actuator 72 even though a front adjusting signal has been received by the FS microcomputer 70 from the microcomputer 60; or (4) the microcomputer 60 in the controller 14 stopping the supply of power to the front suspension 16 and/or selected components of the front suspension 16.

Moreover, the bicycle suspension control apparatus is not limited to illustrated configurations. For example, the bicycle suspension control apparatus can be configured such that the power sensor 62 is disposed on the power supply 20. Also the bicycle suspension control apparatus can be configured such that a microcomputer (not shown) is provided in the power supply 20 with the microcomputer (not shown) of the power supply 20 forming a part of the bicycle adjusting controller. In such a case, the bicycle suspension control apparatus can be further configured such that the main microcomputer 60, the front suspension microcomputer 70, the rear suspension microcomputer 80 and/or the microcomputer (not shown) of the power supply 20 can be combined together.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle suspension control apparatus comprising:
   a power supply sensor that detects a power level of a power supply being supplied from the power supply to electrically adjustable front and rear suspensions; and
   a controller configured to selectively change at least one electrically adjustable suspension parameter of each of the front and rear suspensions,
   the controller receiving a power level signal from the power supply sensor,
   the controller prohibiting changing the electrically adjustable suspension parameter of the rear suspension upon the power supply sensor detecting the power level of the power supply being below a first prescribed power level, and
   the controller permitting changing the electrically adjustable suspension parameter of the front suspension upon the power supply sensor detecting the power level of the power supply being below the first prescribed power level.

2. The bicycle suspension control apparatus according to claim 1, wherein
   the controller prohibits changing the electrically adjustable suspension parameter of the front suspension upon the power supply sensor detecting the power level of the power supply being below a second prescribed power level that is lower than the first prescribed power level.

3. The bicycle suspension control apparatus according to claim 2, wherein
   the controller sets the second prescribed power level to a value that stops adjustment of both of the rear and front suspensions prior to complete discharge of the power supply while the power level of the power supply is below the second prescribed power level.

4. The bicycle suspension control apparatus according to claim 1, wherein
   the power supply sensor includes a voltage sensor.

5. The bicycle suspension control apparatus according to claim 1, wherein
   the controller is further configured to selectively change a setting state of the rear suspension between a lockout state and a non-lockout state as the electrically adjustable suspension parameter that is prohibited from being changed while the power level of the power supply is below the first prescribed power level.

6. The bicycle suspension control apparatus according to claim 1, wherein
   the controller is further configured to selectively change a damping rate of the rear suspension as the electrically adjustable suspension parameter that is prohibited from being changed while the power level of the power supply is below the first prescribed power level.

7. The bicycle suspension control apparatus according to claim 1, wherein
   the controller is further configured to selectively change a travel-stroke length of the rear suspension as the electrically adjustable suspension parameter that is prohibited from being changed while the power level of the power supply is below the first prescribed power level.

8. The bicycle suspension control apparatus according to claim 1, wherein
   the controller is further configured to prohibit electrical energy from being supplied to change any electrically adjustable suspension parameter of the rear suspension while the power level of the power supply is below the first prescribed power level.

9. A bicycle suspension control method comprising:
   detecting a power level of a power supply that supplies power to change at least one electrically adjustable suspension parameter of electrically adjustable from and rear suspensions;
   prohibiting changing of the electrically adjustable suspension parameter of the rear suspension upon detecting the power level of the power supply being below a first prescribed power level; and
   permitting changing of the electrically adjustable suspension parameter of the front suspension upon detecting the power level of the power supply being below the first prescribed power level.

10. The bicycle suspension control method according to claim 9, further comprising
    prohibiting changing of the electrically adjustable suspension parameter of the from suspension upon detecting the power level of the power supply being below a second prescribed power level that is lower than the first prescribed power level.

* * * * *